(12) United States Patent
Jo

(10) Patent No.: US 7,384,362 B2
(45) Date of Patent: Jun. 10, 2008

(54) GEAR-TYPE CONTINUOUSLY VARIABLE TRANSMISSION

(76) Inventor: Koang-Ho Jo, B-402 Cheong cheon green billra, 68-91 Cheong, Cheon-dong, Bupyeong-ku, Incheon-chi 403-030 (KR)

( * ) Notice: Subject to any disclaimer, the term of this patent is extended or adjusted under 35 U.S.C. 154(b) by 319 days.

(21) Appl. No.: 10/521,541

(22) PCT Filed: Jul. 12, 2003

(86) PCT No.: PCT/KR03/01386

§ 371 (c)(1),
(2), (4) Date: Mar. 7, 2005

(87) PCT Pub. No.: WO2004/007227

PCT Pub. Date: Jan. 22, 2004

(65) Prior Publication Data

US 2005/0233855 A1   Oct. 20, 2005

(30) Foreign Application Priority Data

Jul. 16, 2002   (KR) .................. 10-2002-0041827

(51) Int. Cl.
*F16H 48/20* (2006.01)
(52) U.S. Cl. ..................... 475/221; 475/219
(58) Field of Classification Search ............. 475/219, 475/220, 221, 296, 343, 5; 74/143
See application file for complete search history.

(56) References Cited

U.S. PATENT DOCUMENTS 3,242,769 A * 3/1966 Johnson ............... 475/218

4,327,604 A 5/1982 Evans
5,662,009 A * 9/1997 Palmer ................. 74/810.1

FOREIGN PATENT DOCUMENTS

| EP | 0143365 | 6/1985 |
|----|---------|--------|
| JP | 06109089 | 4/1994 |
| JP | 200016102 | 1/2000 |
| KR | 20000012155 | 3/2000 |
| KR | 20000073560 | 12/2000 |

* cited by examiner

*Primary Examiner*—Charles A. Marmor
*Assistant Examiner*—Derek D. Knight
(74) *Attorney, Agent, or Firm*—IPLA P.A.; James E. Bame

(57) ABSTRACT

All power generating member for generating a torque needs a transmission for randomly controlling the torque. Most of current transmission utilizes the engagement of gears having different gear rates or frictions as a medium. The transmission according to the engagement of gears generates the transmission the transmission shock and the transmission utilizing the friction as a medium has a limit caused by the friction. In order to resolve the problems, it is suggested to construct elements which may move in position in gears to distribute the torque to a low speed line or a high speed gear line in the constant engagement state, thereby realizing the continuous speed change from the high speed to the low speed or vise versa. Such a continuously variable transmission is applicable to vehicles and heavy equipment utilizing an internal combustion engine as a power generating source and any other vehicles.

5 Claims, 6 Drawing Sheets

[leverage effect]

[leverage effect transmission]

[leverage effect transmission]

GEAR-TYPE CONTINUOUSLY VARIABLE TRANSMISSION

BACKGROUND OF THE INVENTION

1. Field of the Invention

The present invention relates to a vehicle transmission, and more particularly to, a continuous variable transmission for realizing the continuous variable transmission of a vehicle via gears by converting a torque output from an engine properly according to the driving speed of the vehicle.

2. Background Art

The driving force for driving a vehicle is generated from an internal combustion engine, which is formed in a small size but outputs a large scaled force. The internal combustion engine has, however, disadvantages that a maximum torque area changes in a small range, and a rotation force of the engine is maximum at a medium speed. In order to resolve these problems, it is necessary to develop a transmission for using power effectively and maximizing the change of the torque area.

Even though a transmission for carrying out the transmission by the engagement between gears having different gear rates from each other and a transmission for utilizing friction as a medium have been suggested, there are still problems such as the transmission shock and the friction. Therefore, there is a continuous demand on an ideal transmission.

Many manufacturers are concentrated on the development of such transmissions so far. for obtaining a solid and effective transmission, which is easy to repair at a low cost.

DISCLOSURE OF THE INVENTION

Therefore, the present invention is derived to resolve the above disadvantages and problems of the related art and has an object to provide continuously variable transmission in the gear type, which includes a main shaft 21 and an auxiliary shaft 22, each being formed with shaft grooves 25 (FIG. 3) in the center and hollow parts 26 (FIG. 3) at a side to incorporate transmission varying elements and provided with control levers 61, 62, pinion gears 306, 307, and rack gears 71, 72 in the center portion, control casings 12, 13 supporting the shafts of control gears 302, 303, 304, 305 incorporating planetary gears 41, 42, 43, 44, side gears 37, 38, 39, 301 provided at both sides of the control casings 12, 13 of the main shaft and the auxiliary shaft and engaged with the control gears 302, 303, 304, 305 in the control casings 12, 13 always, ring gears 31, 32, 33, 34 coupled with the side gears 37, 38, 39, 301 provided to the main shaft 21 and the auxiliary shaft 22, and having different gear rates from each other, idle gears 35, 36 connecting the ring gears 31, 32 of the main shaft 21 to the ring gears 33, 34 of the auxiliary shaft 22, and a casing 11 supporting the main shaft 21, the auxiliary shaft 22 and the idle gears 35, 36.

According to the present invention, the main shaft 21 and the auxiliary shaft 22 are formed with the grooves for control levers 61, 62 and the pinion gears 306, 307 in the center, wherein the grooves for the pinion gears 306, 307 are in parallel to the grooves for the control levers 61, 62 apart from the grooves for the control levers 61, 62.

The main shaft 21 and the auxiliary shaft 22 are formed with the hollow parts integrated to the grooves for the control levers 61, 62 and the grooves for the pinion gears 306, 307.

The pinion gears 306, 307 are provided in the grooves for the pinion gears 306, 307 of the main shaft 21 and the auxiliary shaft 22, so that the pinion gears 306, 307 are engaged with the rack gears 71, 72.

The control levers 61, 62 are formed with gears at a side and axial grooves at the other side. Therefore, the gears of the control levers 61, 62 are engaged with the pinion gears 306, 307, and the axial grooves at the other side of the control levers 61, 62 are connected to planetary gear carriers 51, 52, 53, 54.

The control casings 12, 13 supports the control gears 302, 303, 304, 305 that are supported to the main shaft 21 and the auxiliary shaft 22.

The plurality of side gears 37, 38, 39, 301 are provided at the sides of the control casings 12, 13 which are positioned in the center of the main shaft 21 and the auxiliary shaft 22 and always in the engagement state with the plurality of control gears 302, 303, 304, 305 in the control casings 12, 13.

The ring gears 31, 33 are integrated with the side gears 37, 39 at a side of the control casings 12, 13 of the main shaft 21 and the auxiliary shaft 22.

The ring gears 32, 34 are integrated with the other side gears 38, 301 provided to the other side of the control casings 12, 13 of the main shaft 21 and the auxiliary shaft 22.

The idle gears 35, 36 are engaged between the ring gears 31, 33 formed at a side of the main shaft 21 and the auxiliary shaft 22 and the other ring gears 32, 34 formed at the other side of the main shaft 21 and the auxiliary shaft 22.

The casing 11 supports the main shaft 21, the auxiliary shaft 22 and the shafts of the idle gears 35, 36 by bearings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or the similar components, wherein.

BEST MODE FOR CARRYING OUT THE INVENTION

The present invention will be explained in more detail with reference to preferred embodiments in junctions with the attached drawings.

Figure 1:
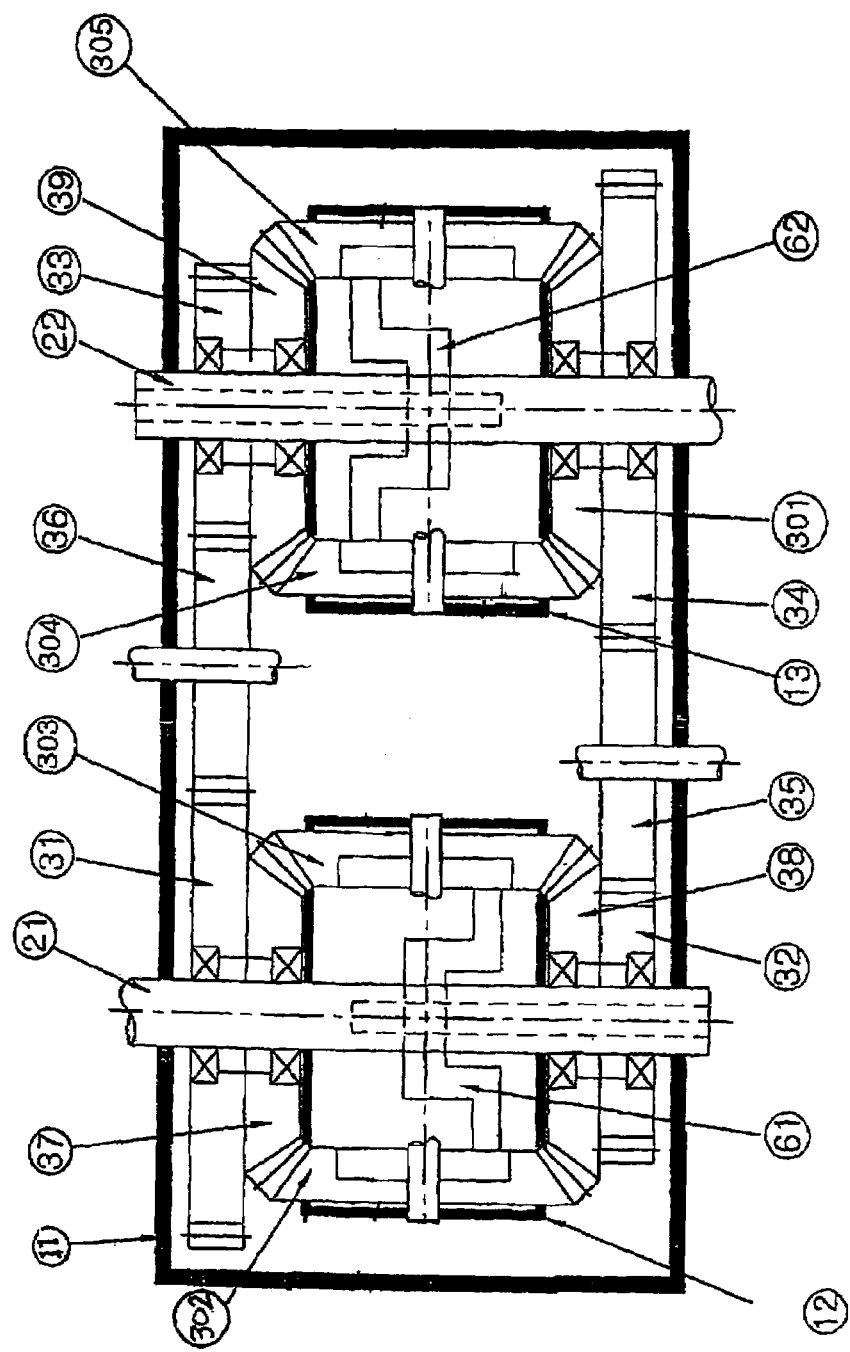
FIG. 1 is a schematic view for showing the construction of a continuously variable transmission in the gear type at a low speed.
Figure 2:
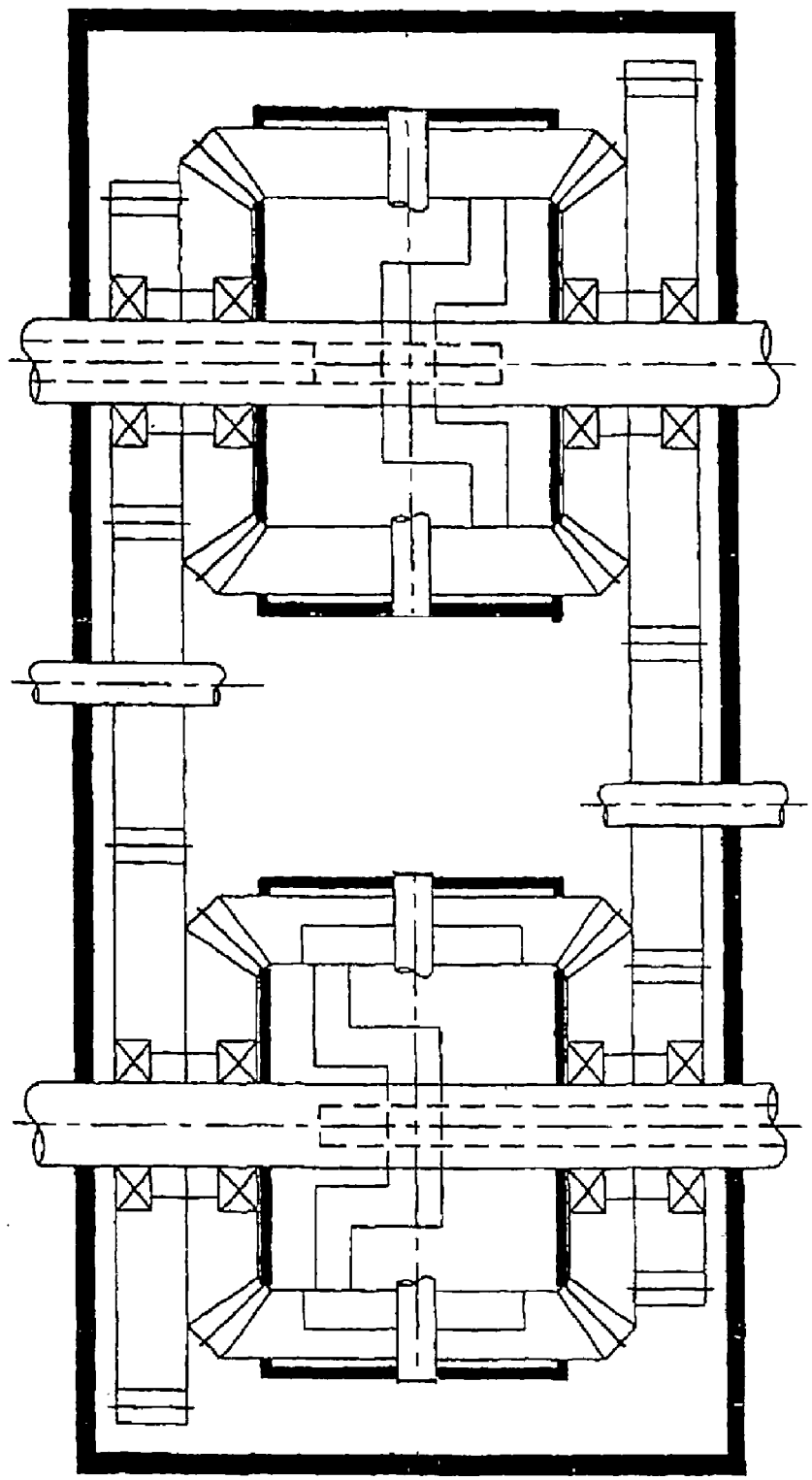
FIG. 2 is a schematic view for showing the construction of a continuously variable transmission in the gear type at a high speed.
Figure 3:
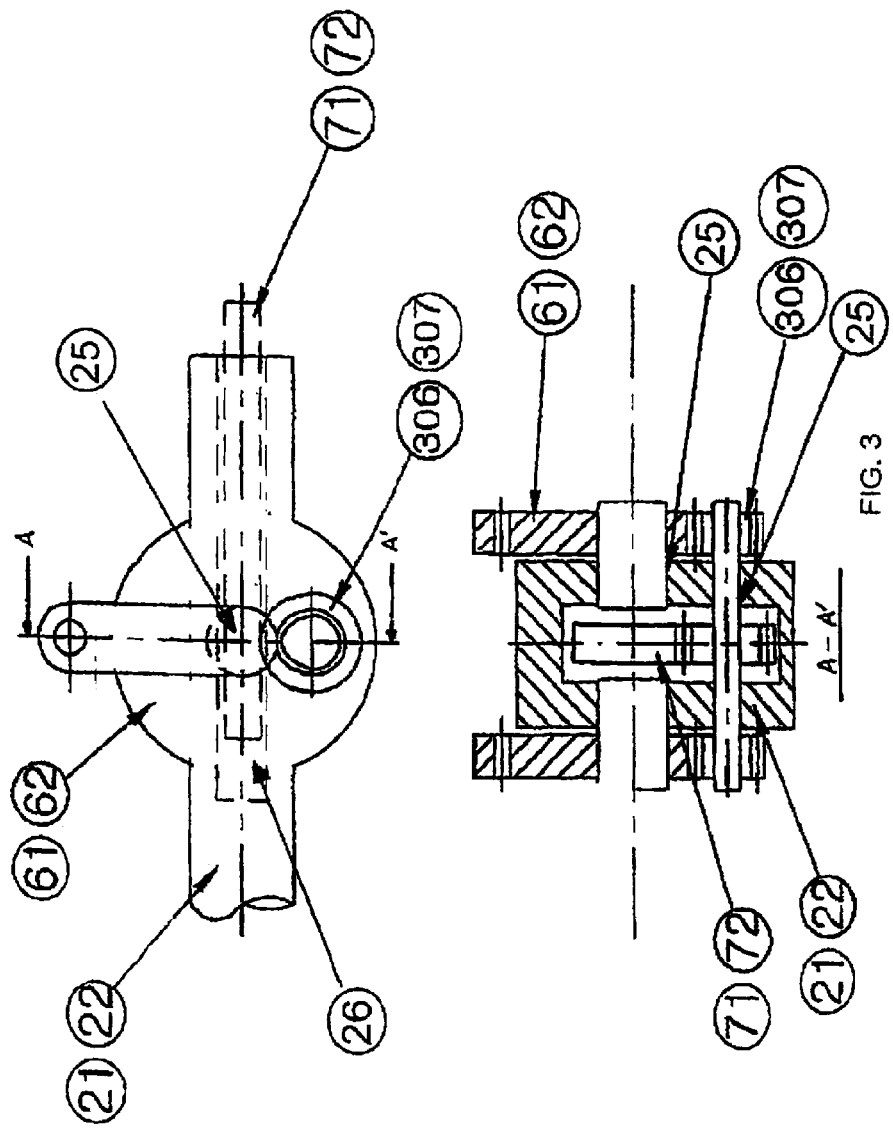
FIG. 3 is a structural view of showing transmission elements of a main shaft and an auxiliary shaft.
Figure 4:
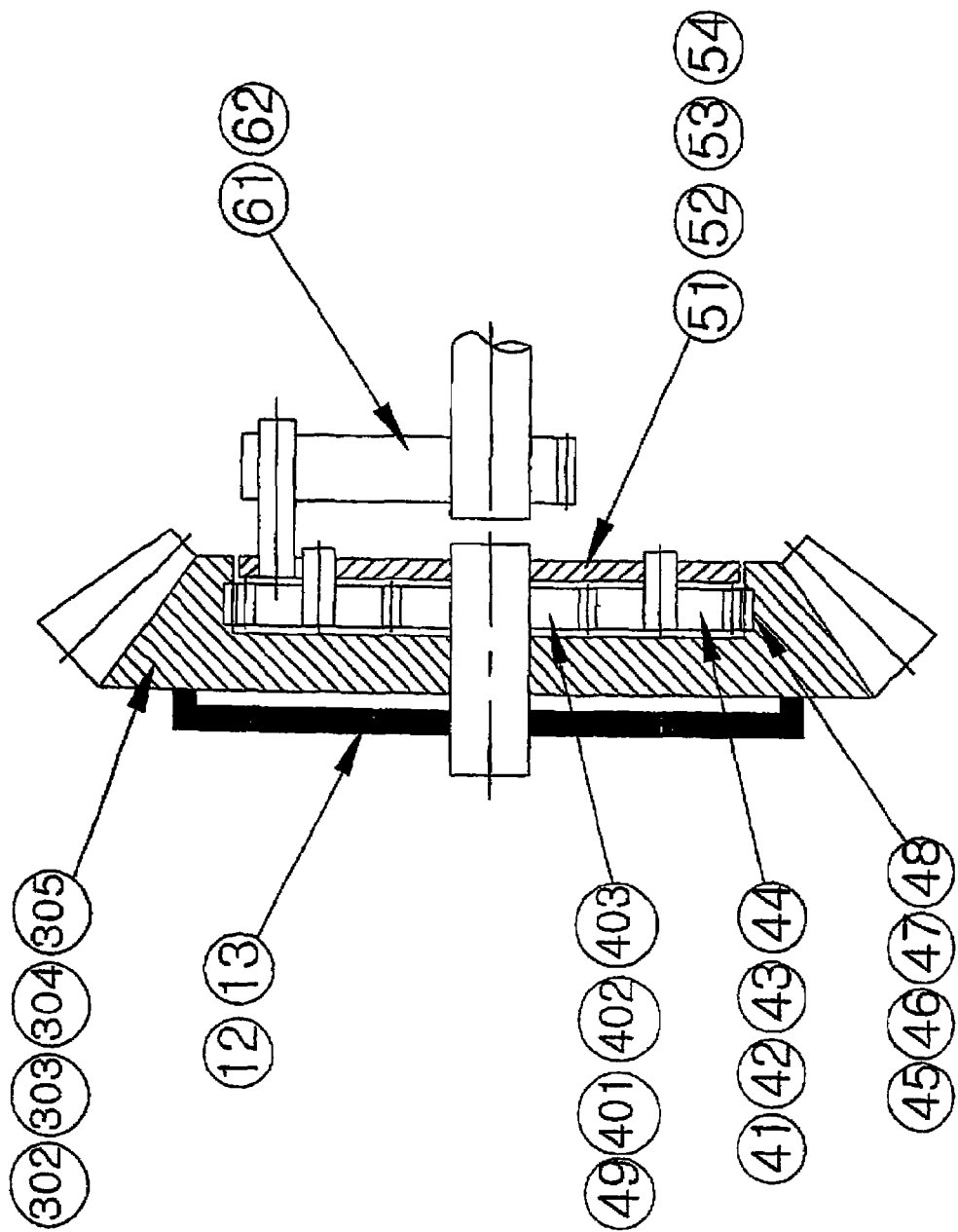
FIG. 4 is a cross sectional view showing a control gear.

Referring to FIG. 1, ring gears 31, 32, 33, 34 provided to a main shaft 21 and an auxiliary shaft 22 with different gear rates from each other are engaged with idle gears 35, 36 always and supported by bearings in a casing 11.

The ring gears 31, 32, 33, 34 are integrated with side gears 37, 38, 39, 301 which are engaged with control gears 302, 303, 304, 305. The control gears 302, 303, 304, 305 are supported by the main shaft 21 and the auxiliary shaft 22 at both sides in the side gears 37, 38, 39, 301.

Planetary gear carriers 51, 52, 53, 54 provided in the control gears 302, 303, 304, 305 are connected to control levers 61, 62 which are connected to the main shaft 21 and the auxiliary shaft 22.

The main shaft 21 and the auxiliary shaft 22 are formed with hollow parts and provided with rack gears 71, 72. The rack gears 71, 72 are engaged with pinion gears 306, 307 and the pinion gears 306, 307 are engaged with gears of the control levers 61, 62.

The control levers 61, 62 are connected to the planetary gear carriers 51, 52, 53. 54 in the control gears 302, 303, 304, 305, and engaged with control ring gears 45, 46, 47, 48, planetary gears 41, 42, 43, 44 and linear gears 49, 401, 402, 403 in the control gears 302, 303, 304, 305. In the continuously variable transmission constructed as above, the rack gear 71 of the main shaft 21 variably moves in the axial direction, so that the axis of the pinion gear 306 reciprocatingly and variably rotates. The control lever 61, with which the pinion gear 306 is engaged and to which an input torque from the main shaft 21, reciprocatingly and variably rotates in the axial direction of the main shaft 21. The planetary gears 41, 42 reciprocatingly and variably rotate in the control ring gears 45, 46 of the control gears 302, 303 by the planetary gear carriers 51, 52 that are connected to the control lever 61, so that the torque is variably distributed to both sides of the control gears 302, 303.

The control gears 302, 303 are engaged with the side gears 37, 38 at both sides. The side gears 37, 38 are integrated with the ring gears 31, 32. The distribution of the torque is transmitted to the ring gears 31, 32 at both sides of the main shaft 21 according to the position of the control lever 61.

The ring gear 31, 32 formed at both sides of the main shaft 21 are engaged with the ring gears 33, 34 formed at both sides of the auxiliary shaft 22 by the idle gears 35, 36.

The ring gears 33, 34 of the auxiliary shaft 22 are integrated with the side gears 39, 301, and the side gears 39, 301 are engaged with the control gears 304, 305, so that the planetary gear carriers 53, 54 provided to the shafts of the control gears 304, 305 may variably distribute the torque to both sides.

The shaft of the pinion gear 307 reciprocatingly and variably rotates by the reciprocating and variable rotation in the axial direction of the rack rear 72 of the auxiliary shaft 22.

The torque is transmitted from the planetary gear carriers 53, 54 in the control gears 304, 305 to the control lever 62 engaged with the pinion gear 307. The control lever 62 reciprociatingly and variably rotate in the axial direction of the auxiliary shaft 22 to output the torque to the auxiliary shaft 22.

Therefore, as the rack gears 71, 72 of the main shaft 21 and the auxiliary shaft 22 reciprocatingly and variably rotate in the axial direction, the control levers 61, 62 reciprocatingly and variably rotates the planetary gear carriers 51, 52, 53, 54 in the control gears 302, 303, 304, 305, so that the torque is variably distributed to the main shaft 21 and the auxiliary shaft 22 by the ring gears 31, 32, 33, 34 having different gear rates, thereby realizing the continuously variable transmission in the gear type.

In order to realize the ideal continuous variable transmission, a low speed gear line 32, 35, 34 and a high speed gear line 31, 36, 33 are provided to at both sides, and the gear shafts 302, 303, 304, 305 are modified for the converting from the low speed gear to the high speed gear, so that the movement between the both sides in the gears may become possible and the position of the torque transmitted from the shafts to the gears may be varied.

The gear 32 of the low speed gear line and the gear 31 of the high speed gear line are engaged with the main shaft 21 by the plurality of gears 302, 303 of which shafts are modified. The gear 34 of the low speed gear line and the gear 33 of the high speed gear line are engaged with the auxiliary shaft 22 by the plurality of gears 304, 305 of which shafts are modified.

The gears 32, 34 of the low speed gear line of the main shaft 21 and the auxiliary shaft 22 are engaged with each other by the idle gear 35.

The gears 31, 33 of the high speed gear line of the main shaft 21 and the auxiliary shaft 22 are engaged with each other by the idle gear 36.

Figure 5:
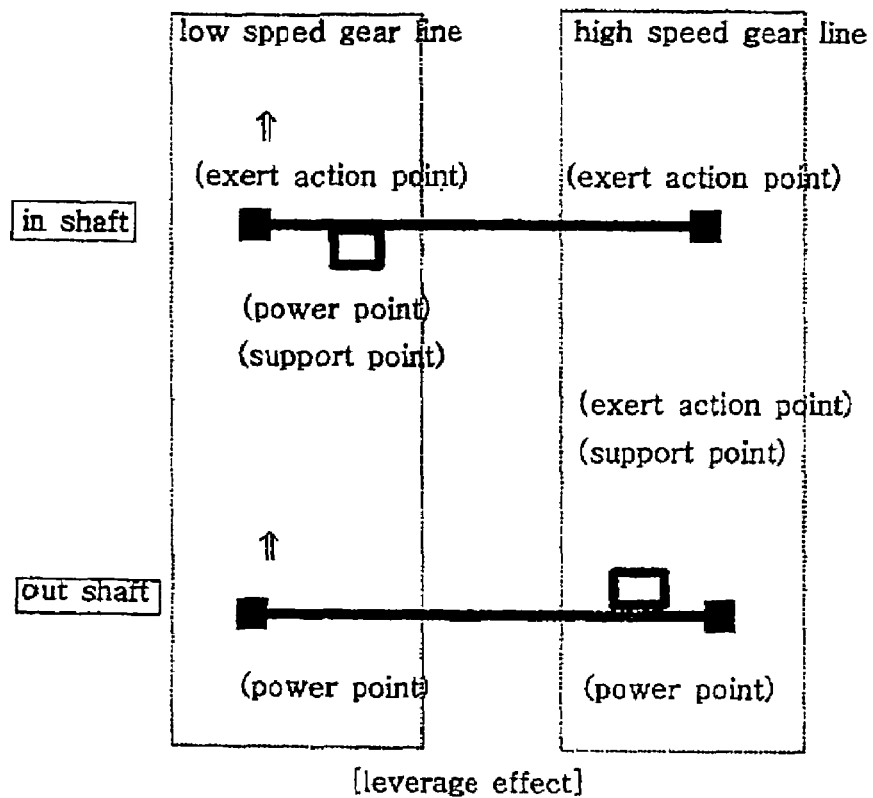
FIG. 5 is a schematic view for explaining the leverage effect when the continuously variable transmission in the gear type is at the low speed.
Figure 5:
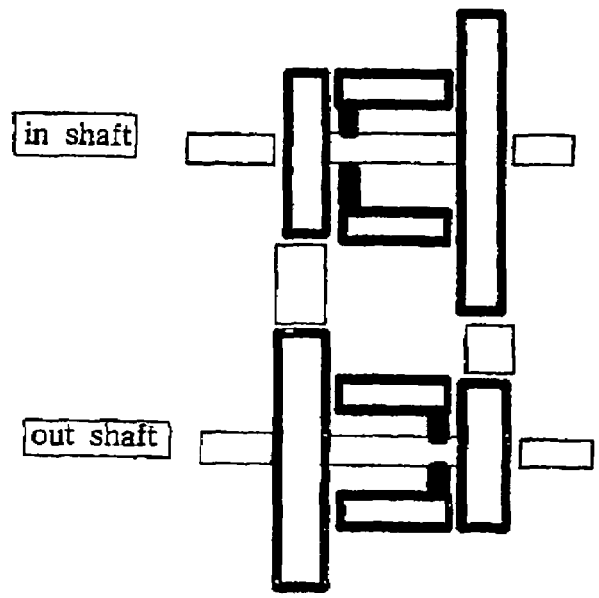

FIG. 5 shows the shape and construction of the engagement in the low speed state.

The gears 32, 35, 34 of the low speed gear line which are transmitted the torque are changed to force points at an output shaft to transmit the torque to a point of application and a supporting point, wherein the point of application and the supporting point output the torque to the output shaft.

Figure 6:
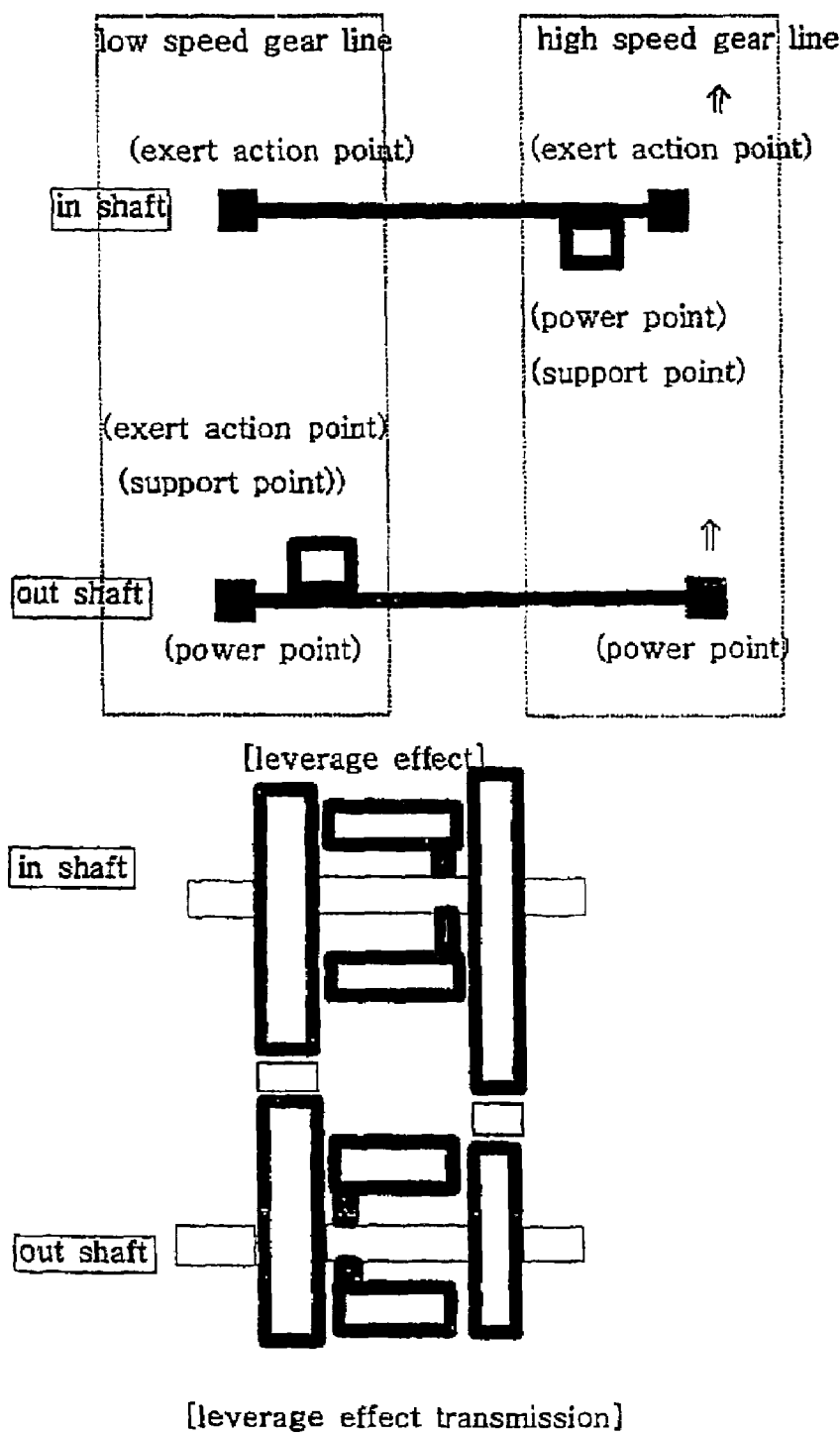
FIG. 6 is a schematic view for explaining the leverage effect when the continuously variable transmission in the gear type is at the high speed.

FIG. 6 shows the shape and construction of the engagement in the high speed state.

A force point and a supporting point of an input shaft are positioned to the point of application of the high speed gear line, so that the torque is transmitted to the gears 31, 36, 33 of the high speed gear line of the input shaft.

The gears 31, 36, 33 of the high speed gear line which is transmitted the torque are changed to a force point at the output shaft to transmit the torque to the point of application and the supporting point, wherein the point of application and the supporting point output the torque to the output shaft.

As described hereinabove, the torque may be distributed to the high and low speed gear lines according to the torque distribution of the gears 302, 303, 304, 305 of which shaft may be modified, thereby randomly realizing the high and low speed output.

INDUSTRIAL APPLICABILITY

According to the continuously variable transmission in the gear type of the present invention, the continuous engagement state of gears may be kept while power transmission is not blocked and the transmission may be realized smoothly and fluently, thereby reducing the manufacturing cost and the loss of power. Such a continuously variable transmission may be installed to any vehicles.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A gear-type continuously variable transmission comprising:
a main shaft comprising shaft grooves provided in the center and hollow parts provided along an axis of the main shaft;
first and second control gears, wherein each comprises a planetary gear carrier, wherein the first and second control gears are connected to the main shaft through a first control lever, wherein the first control lever comprises a gear portion at one end and an axial groove at an other end, wherein the one end of the first control lever is connected with the shaft grooves of the main shaft, and wherein the other end of the first control lever is connected with the planetary gear carriers of the first and second control gears;

first and second side gears disposed around the main shaft, the first and second side gears being engaged with the first and second control gears;

first and second ring gears integrated with the first and second side gears respectively;

an auxiliary shaft disposed in parallel to and apart by a predetermined distance from the main shaft, the auxiliary shaft comprising shaft grooves provided in the center and hollow parts provided along an axis of the auxiliary shaft;

third and fourth control gears, wherein each comprises a planetary gear carrier, and wherein the third and fourth control gears are connected to the auxiliary shaft through a second control lever, wherein the second control lever comprises a gear portion at one end and an axial groove at an other end, wherein the one end of the second control lever is connected with the shaft grooves of the auxiliary shaft, and wherein the other end of the second control lever is connected with the planetary gear carriers of the third and fourth control gears;

third and fourth side gears disposed around the auxiliary shaft, the third and fourth side gears being engaged with the third and fourth control gears;

third and fourth ring gears integrated with the third and fourth side gears respectively; and first and second idle gears, wherein the first idle gear connects the first ring gear to the third ring gear so as to form a high speed gear line, and wherein the second idle gear connects the second ring gear to the fourth ring gear so as to form a low speed gear line, wherein an input torque from the main shaft is variably and continuously distributed to the high speed gear line and the low speed gear line according to the position of the first control lever, and wherein an output torque to the auxiliary shaft is variably and continuously distributed to the high speed gear line and the low speed gear line according to the position of the second control lever.

2. The transmission according to claim 1, wherein the grooves formed in the centers of the main shaft and the auxiliary shaft are aligned with the control gear shafts which are orthogonal to the main shaft and the auxiliary shaft.

3. The transmission according to claim 1, wherein each of the main shaft and the auxiliary shaft is connected with the corresponding control gears by a rack gear and pinion gear though the hollow parts.

4. The transmission according to claim 1, wherein each of the control gears further comprises first to fourth planetary gears, the control ring gears, and linear gears.

5. The transmission according to claim 1, wherein the first and third ring gears in the high speed gear line have a first gear ratio representing a high speed transmission from the first ring gear to the third ring gear, and wherein the second and fourth ring gears in the low speed gear line have a second gear ratio representing a low speed transmission from the second ring gear to the fourth ring gear.

* * * * *